(12) United States Patent
Izumi

(10) Patent No.: US 7,042,435 B2
(45) Date of Patent: May 9, 2006

(54) LIQUID CRYSTAL DISPLAY APPARATUS

(75) Inventor: Tomoo Izumi, Toyonaka (JP)

(73) Assignee: Minolta Co., Ltd., Osaka (JP)

( * ) Notice: Subject to any disclaimer, the term of this patent is extended or adjusted under 35 U.S.C. 154(b) by 372 days.

(21) Appl. No.: 10/393,323

(22) Filed: Mar. 20, 2003

(65) Prior Publication Data

US 2004/0119678 A1 Jun. 24, 2004

(30) Foreign Application Priority Data

Dec. 24, 2002 (JP) ............................. 2002-373073

(51) Int. Cl.
*G09G 3/36* (2006.01)
(52) U.S. Cl. ........................................ 345/101; 349/72
(58) Field of Classification Search ................ 345/101; 349/72
See application file for complete search history.

(56) References Cited

U.S. PATENT DOCUMENTS

| | | | | |
|---|---|---|---|---|
| 5,398,042 A | * | 3/1995 | Hughes | ........................ 345/94 |
| 5,748,277 A | | 5/1998 | Huang et al. | ................ 349/169 |
| 6,115,021 A | | 9/2000 | Nonomura et al. | ......... 345/101 |
| 6,154,190 A | | 11/2000 | Yang et al. | .................... 345/94 |

FOREIGN PATENT DOCUMENTS

| | | |
|---|---|---|
| JP | 62-118326 A | 5/1987 |
| WO | WO 02/073297 A1 | 9/2002 |

OTHER PUBLICATIONS

U.S. Appl. No. 10/221,508, filed Sep. 13, 2002, Masazumi et al.

* cited by examiner

*Primary Examiner*—Sumati Lefkowitz
*Assistant Examiner*—Ke Xiao
(74) *Attorney, Agent, or Firm*—Sidley Austin LLP

(57) ABSTRACT

A liquid crystal display apparatus has a liquid crystal display with a plurality of pixels arranged in a matrix, a scanning electrode driver and a signal electrode driver for driving the liquid crystal display, and a controller which controls the scanning electrode driver to change waveforms of pulses output therefrom with changes in circumstantial temperature of the liquid crystal display. The controller controls the scanning electrode driver to heighten a selection pulse voltage and to narrow a selection pulse width with a rise in circumstantial temperature and to lower the selection pulse voltage and to widen the selection pulse width with a fall in circumstantial temperature.

19 Claims, 12 Drawing Sheets

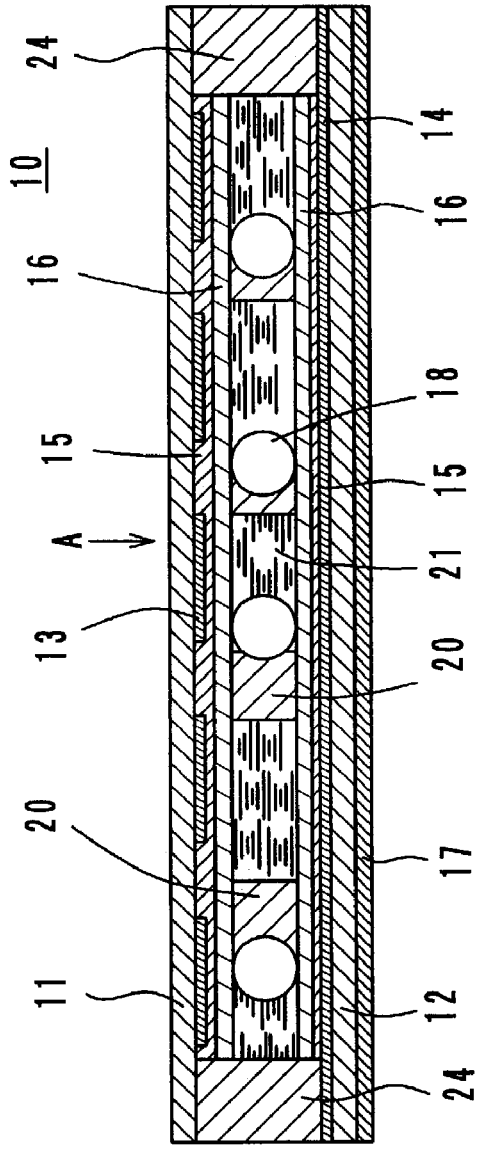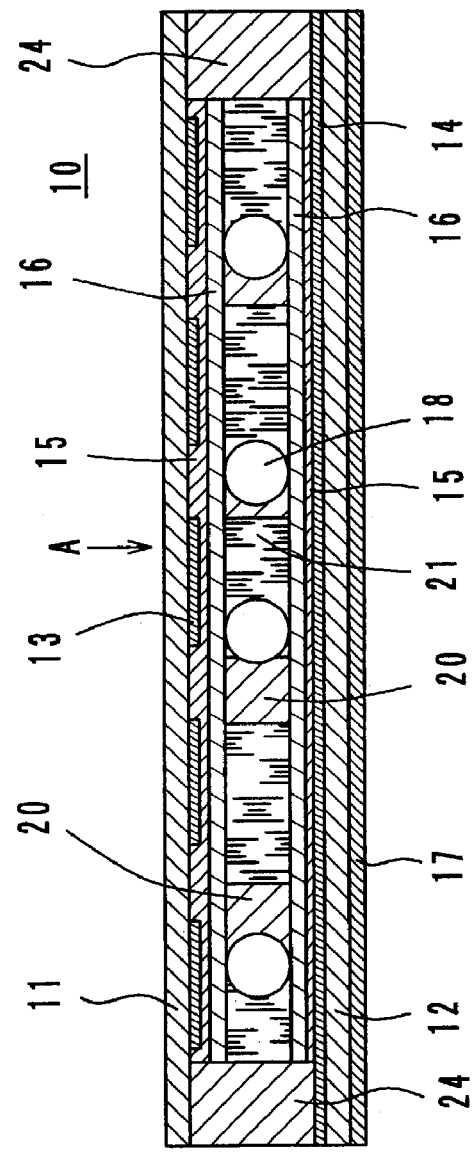

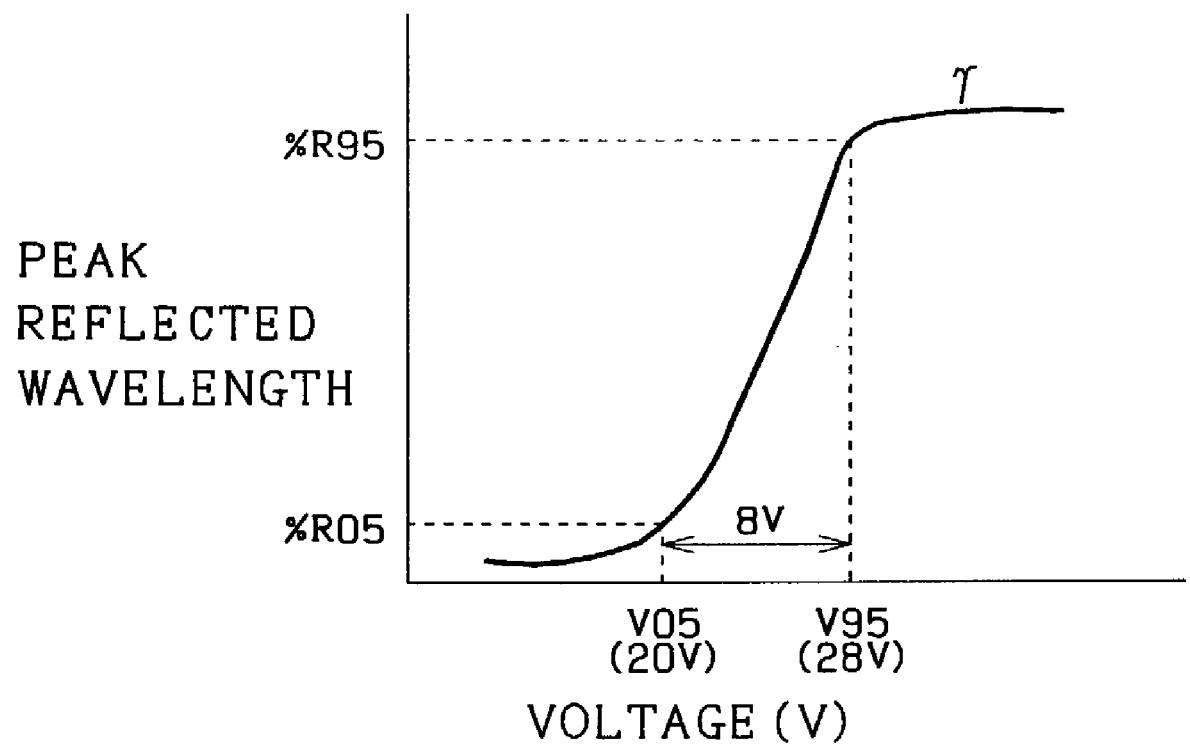
F I G. 5

LIQUID CRYSTAL DISPLAY APPARATUS

This application is based on Japanese patent application No. 2002-373073, the content of which is incorporated herein by reference.

BACKGROUND OF THE INVENTION

1. Field of the Invention

The present invention relates to a liquid crystal display apparatus, and more particularly to a liquid crystal display apparatus of which display status is changed in response to application of a pulse voltage.

2. Description of Related Art

In recent years, as media for reproducing digital information into visual information, reflective type liquid crystal displays which use liquid crystal which exhibits a cholesteric phase at room temperature (typically, chiral nematic liquid crystal) have been provided and developed into various kinds because such liquid crystal displays can keep displaying an image with no voltages applied thereto, thereby resulting in a reduction in power consumption, and because such liquid crystal displays can be produced at low cost.

In order to write an image on such a liquid crystal display, a driving method which comprises a step of applying a reset pulse to reset the liquid crystal to a homeotropic state, a step of applying a selection pulse to determine the final state of the liquid crystal and a step of applying an evolution pulse to cause the liquid crystal to evolve to the selected state has been suggested, for example, in the following documents.

Reference 1: U.S. Pat. No. 5,748,277

This reference discloses a dynamic driving method which uses a preparation voltage, a selection voltage and an evolution voltage. These voltages are pulse voltages of alternating waves.

Reference 2: U.S. Pat. No. 6,154,190

This reference discloses a dynamic driving method which comprises a post-preparation phase and an after-selection phase respectively before and after a selection pulse application phase.

Reference 3: WO 02/073297

This reference discloses that in driving a liquid crystal display which uses liquid crystal which exhibits a cholesteric phase, the lengths of driving pulses are changed in accordance with the circumstantial temperature.

Liquid crystal displays are used under various temperatures, and are usually expected to be used within a temperature range from −20° C. to 60° C. With respect to chiral nematic liquid crystal, its responsibility to a driving pulse changes with changes in circumstantial temperature. According to the reference 3, the widths of driving pulses are changed with changes in circumstantial temperature so that the change in responsibility of chiral nematic liquid crystal can be compensated; more specifically, when the circumstantial temperature is high, the widths of driving pulses are shorter, and when the circumstantial temperature is low, the widths of driving pulses are longer. Even with this adjustment, however, there occur problems such as lowering of contrast and unavailability of a proper γ curve, which indicates the relationship between a voltage applied to liquid crystal and the reflectance of the liquid crystal finally obtained by the application of the voltage. The present inventors have found out that these problems are caused by the fact that the viscosity and the anisotropy of dielectric constant of chiral nematic liquid crystal also change with changes in circumstantial temperature.

SUMMARY OF THE INVENTION

An object of the present invention is to provide a liquid crystal display apparatus which can obtain good contrast and a proper γ curve within the entire operating temperature range.

In order to attain the object, a liquid crystal display apparatus according to a first aspect of the present invention comprises: a liquid crystal display which comprises a plurality of pixels arranged in a matrix; a driving circuit which comprises a scanning electrode driver and a signal electrode driver and which drives the liquid crystal display by a simple matrix driving method; and a controller which controls the driving circuit in such a way that waveforms of pulses output from the scanning electrode driver change depending on a circumstantial temperature of the liquid crystal display. In the apparatus, the controller controls the driving circuit to heighten a voltage of a selection pulse, which is output from the scanning electrode driver to determine a final state of the liquid crystal, with a rise in circumstantial temperature within a specified temperature range and to lower the voltage of the selection pulse with a fall in circumstantial temperature within the temperature range.

Liquid crystal and especially a kind of liquid crystal which comprises a liquid crystal composition produced by adding a chiral agent to nematic liquid crystal and which makes a display by using selective reflection of a cholestric liquid crystal phase is apt to become lower in viscosity and in anisotropy of dielectric constant as the circumstantial temperature is rising. In the liquid crystal display apparatus according to the first aspect of the present invention, when the circumstantial temperature rises within a specified temperature range, the voltage of the selection pulse output from the scanning electrode driver is heightened, and when the circumstantial temperature falls within the temperature range, the voltage of the selection pulse is lowered. Thereby, a change in responsibility of the liquid crystal due to a change in anisotropy of dielectric constant of the liquid crystal can be compensated within the temperature range. Thus, by changing the waveforms of driving pulses depending on circumstantial temperature, a change in responsibility of liquid crystal due to a change in anisotropy of dielectric constant can be compensated, and good contrast and a proper γ curve can be maintained.

Preferably, the controller also controls the driving circuit to narrow the width of the selection pulse with a rise in circumstantial temperature and to widen the width of the selection pulse with a fall in circumstantial temperature. Thereby, a change in responsibility of the liquid crystal due to a change in viscosity of the liquid crystal with a change in temperature can be compensated.

The scanning electrode driver outputs a chain of driving pulses of different kinds, and the controller may control the driving circuit in such a way that within a specified temperature range, the total length of the chain of driving pulses changes depending on the circumstantial temperature while the ratio of the widths of the pulses to one another is constant. With this control, within the temperature range, a change in responsibility of the liquid crystal due to a change in viscosity of the liquid crystal with a change in temperature can be compensated.

The controller also may control the driving circuit to heighten the voltage of the selection pulse output from the scanning electrode driver with a rise in circumstantial temperature within each range of a first temperature range and a second temperature range and to lower the voltage of the selection pulse with a fall in circumstantial temperature within each range of the first temperature range and the second temperature range, and the heightening/lowering of the selection pulse voltage within the first temperature range and the heightening/lowering of the selection pulse voltage within the second temperature range are based on mutually different characteristic curves. By using different characteristic curves for the heightening/lowering of the selection pulse voltage within a first temperature range and for the heightening/lowering of the selection pulse voltage within a second temperature range, respectively, the selection pulse voltage is prevented from changing in a too wide range. Preferably, the characteristic curve which determines the heightening/lowering of the selection pulse voltage within a lower temperature range shows larger values than the characteristic curve which determines the heightening/lowering of the selection pulse voltage within a higher temperature range.

The pulses output from the signal electrode driver are preferably of alternating voltages so as to suppress crosstalk. The pulses output from the scanning electrode driver may be of direct voltages or may be of alternating voltages. When direct voltages are used for the pulses output from the scanning electrode driver, the power consumption is reduced, and when alternating voltages are used, the liquid crystal is prevented from aging. The controller may control the driving circuit to change the phase of the pulses output from the signal electrode driver, so that intermediate tones can be well displayed.

The controller also may control the driving circuit to keep the voltage of the pulses outputted from the signal electrode driver regardless of changes in circumstantial temperature. In order to realize this control, only a simple structure is required for the power source section.

A liquid crystal display apparatus according to the second aspect of the present invention comprises: a liquid crystal display which comprises a liquid crystal composition containing nematic liquid crystal and a chiral agent, which makes a display by using selective reflection of the liquid crystal composition in a cholesteric phase and which comprises a plurality of pixels arranged in a matrix; a driving circuit which outputs at least a reset pulse for resetting the liquid crystal composition to a homeotropic phase and a selection pulse for determining a final state of the liquid crystal composition; and a controller which controls the driving circuit in such a way that waveforms of pulses change depending on a circumstantial temperature of the liquid crystal display. In the apparatus, the controller controls the driving circuit to heighten a voltage of the selection pulse with a rise in circumstantial temperature and to lower the voltage of the selection pulse with a fall in circumstantial temperature within a specified temperature range.

The operation of the liquid crystal display apparatus according to the second aspect of the present invention and the benefits achieved thereby are basically the same as those of the liquid crystal display according to the first aspect of the present invention.

The driving circuit may further output an evolution pulse for causing the liquid crystal to evolve to a state which was determined by the application of the selection pulse. With this arrangement, the selection pulse width can be narrowed, and accordingly, the scanning speed can be increased. In this case, preferably, the controller controls the driving circuit to change a ratio Tsp/Ts with a change in circumstantial temperature, wherein Tsp is a duration of application of the selection pulse, and Ts is a duration from an end of application of the reset pulse to a start of application of the evolution pulse. With this control, a change in responsibility of the liquid crystal due to a change in temperature can be compensated.

The controller may control the driving circuit to change the voltage of the evolution pulse depending on the circumstantial temperature or to keep the voltage of the evolution pulse regardless of the circumstantial temperature. When the voltage of the evolution pulse is to be changed depending on the circumstantial temperature, the number of parameters to be controlled increases, and the voltage of the selection pulse is to be changed within a narrower range. Thereby, accurate voltage control becomes possible.

The driving circuit may be of the following structure: the driving circuit comprises a scanning electrode driver and a signal electrode driver; the reset pulse, the selection pulse and the evolution pulse are outputted from the scanning electrode driver; and the signal electrode driver outputs pulses in accordance with image data in synchronization with the selection pulse.

A liquid crystal display according to the third aspect of the present invention comprises: a liquid crystal display which comprises a plurality of pixels arranged in a matrix; a driving circuit which selectively applies pulse voltages to liquid crystal of the liquid crystal display so as to drive the liquid crystal display; a temperature sensor which detects a circumstantial temperature of the liquid crystal display; and a controller which controls the driving circuit in such a way that waveforms of pulses change depending on-a circumstantial temperature of the liquid crystal display. In the apparatus, the controller controls the driving circuit to heighten a voltage of a selection pulse, which determines a final state of the liquid crystal, with a rise in circumstantial temperature and lowers the voltage of the selection pulse with a fall in circumstantial temperature.

The operation of the liquid crystal display apparatus according to the third aspect of the present invention and the benefits achieved thereby are basically the same as those of the liquid crystal displays according to the first and second aspects of the present invention.

The controller may control the driving circuit to narrow the width of the selection pulse with a rise in circumstantial temperature and to widen the width of the selection pulse with a fall in circumstantial temperature. With this control, a change in responsibility of the liquid crystal due to a change in viscosity of the liquid crystal with a change in temperature can be compensated.

The controller also may control the driving circuit to heighten the voltage of the selection pulse with a rise in circumstantial temperature within a specified temperature range and to lower the voltage of the selection pulse with a fall in circumstantial temperature within the temperature range.

BRIEF DESCRIPTION OF THE DRAWINGS

This and other objects and features of the present invention will be apparent from the following description with reference to the accompanying drawings, in which:

FIGS. 1a and 1b are sectional views of an exemplary liquid crystal display which are employed in a liquid crystal display apparatus according to a preferred embodiment of the present invention;

FIG. 5 is a graph which shows an exemplary γ curve to explain γ;

DETAILED DESCRIPTION OF PREFERRED EMBODIMENTS

Figure 2:
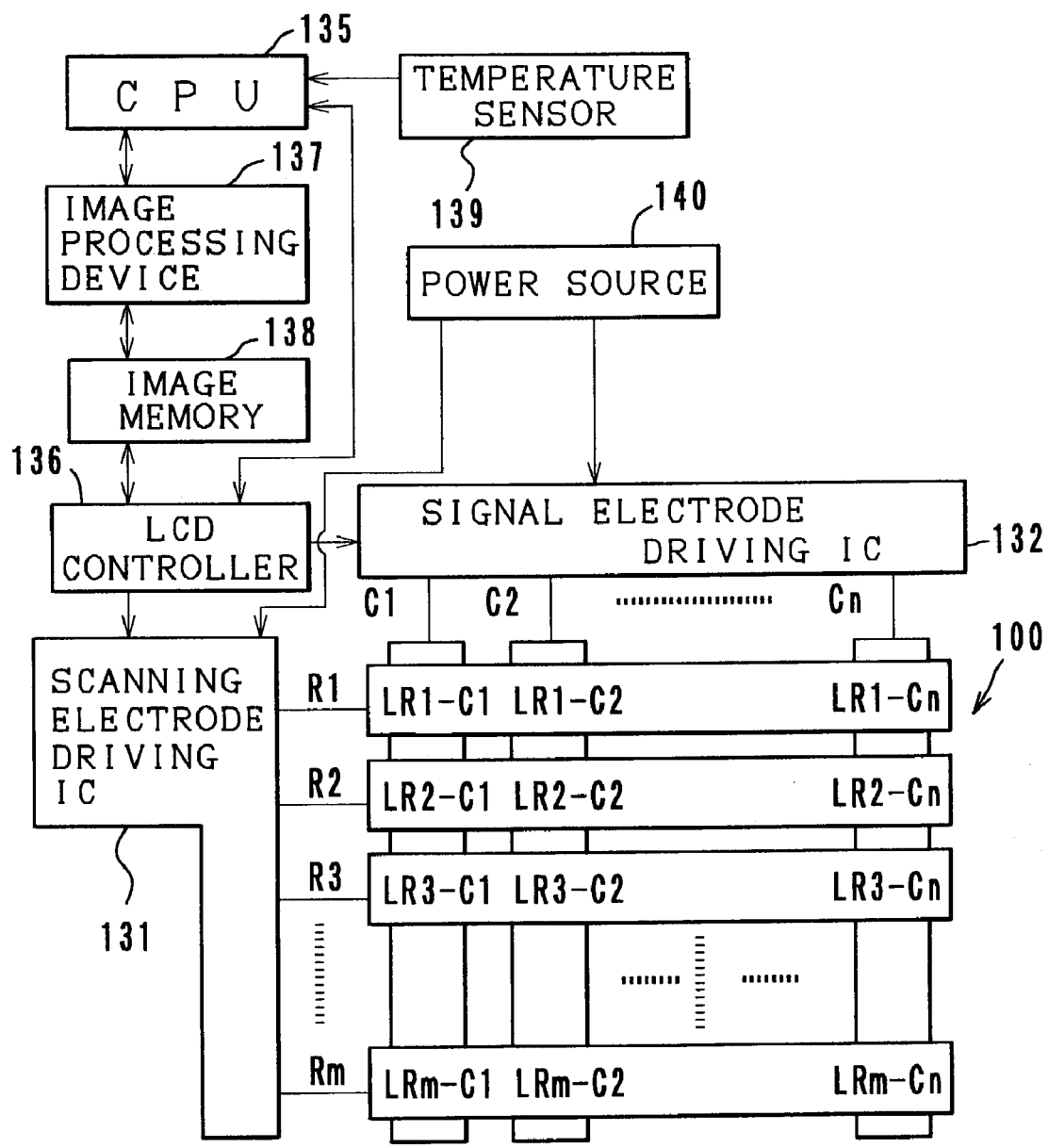
FIG. 2 is a block diagram which shows a control circuit of the liquid crystal display.

Some embodiments of a liquid crystal display apparatus according to the present invention are described with reference to the accompanying drawings.

Structure and Operation of Liquid Crystal Display; See FIGS. 1a and 1b

FIGS. 1a and 1b show an exemplary liquid crystal display 10 which is employed in a liquid crystal display apparatus according to a preferred embodiment of the present invention. The liquid crystal display 10 makes a monochromatic display of blue and white. FIG. 1a shows a planar state (white state) which is caused by application of a high-voltage pulse to the liquid crystal, and FIG. 1b shows a focal-conic state (transparent/blue state) which is cased by application of a low-voltage pulse to the liquid crystal. This liquid crystal has a memory effect and therefore stays in a planar state, a focal-conic state or an intermediate state even after stoppage of the application of the pulse voltage thereto.

The liquid crystal display 10 has liquid crystal 21 and spacers 18 between transparent substrates 11 and 12 which are made of resin, glass or other suitable material and which has transparent electrodes 13 and 14 thereon. The substrates 11 and 12 are bonded together by resin pillars 20. On the transparent electrodes 13 and 14, insulating layers 15 and/or alignment controlling layers 16 are provided if necessary. In the periphery of the substrates 11 and 12 (out of a display area), a sealant 24 is provided so as to seal the liquid crystal 21 between the substrates 11 and 12.

Further, a light absorbing layer 17 is provided on the outside (backside) of the substrate 12 which is located opposite the light incident side (indicated by arrow "A"). In order to make a display of blue, the peak reflected wavelength of the light absorbing layer 17 is within a range from 450 nm to 480 nm.

The transparent electrodes 13 and 14 are connected respectively to a scanning electrode driving IC 131 and a signal electrode driving IC 132, and specified pulse voltages are applied to the transparent electrodes 13 and 14. In response to the voltages applied, the liquid crystal 21 switches between a transparent state to transmit visual light and a selective reflection state to selectively reflect light of a specified wavelength range.

The transparent electrodes 13 and 14 each are composed of a plurality of strip-like electrodes which extend in parallel, and the extending direction of the strip-like electrodes 13 and the extending direction of the strip-like electrodes 14 are perpendicular to each other on horizontal planes. Voltages are applied to these upper and lower electrodes 13 and 14 in sequence, that is, voltages are applied to the liquid crystal 21 in a matrix way. Thereby, a display is made on the liquid crystal 21. This is referred to as matrix driving, and the intersections between the electrodes 13 and 14 serve as pixels.

A liquid crystal display which has liquid crystal which exhibits a cholesteric phase between two substrates makes a display by switching between a planar state and a focal-conic state. When the liquid crystal is in a planar state, light of wavelength λ (λ=P; n, P: helical pitch of the cholestric liquid crystal, n: average refractive index of the liquid crystal). When the liquid crystal is in a focal-conic state, if the wavelength of light selectively reflected by the cholesteric liquid crystal is within the infrared spectrum, the liquid crystal scatters incident light, and if the wavelength of light selectively reflected by the cholesteric liquid crystal is shorter than the infrared spectrum, the liquid crystal scatters light weakly and substantially transmits visible light.

Figure 3:
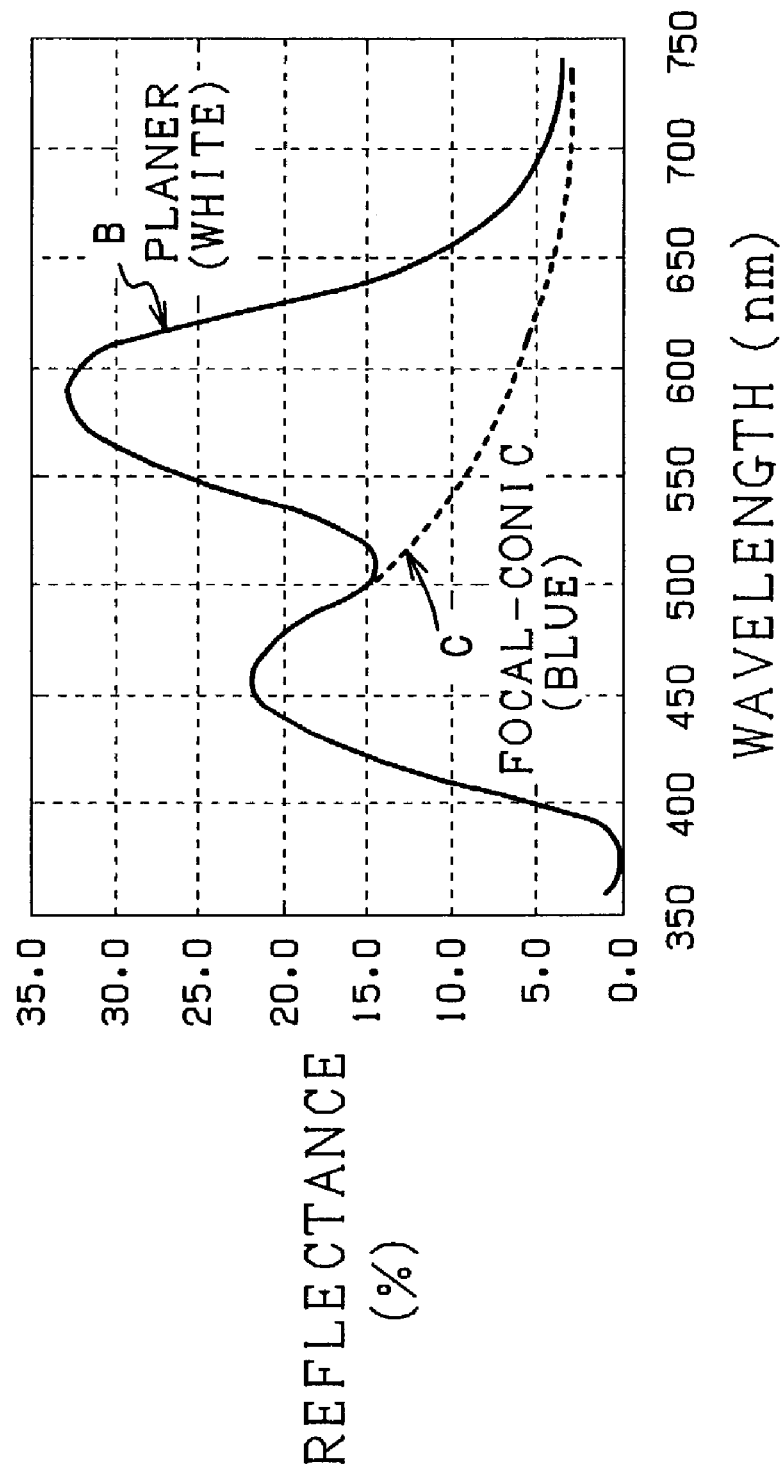
FIG. 3 is a graph which shows reflectance characteristic curves of chiral nematic liquid crystal in a planar state and in a focal-conic state.

In the liquid crystal display 10, as FIG. 3 shows, the liquid crystal has a spectral reflectance characteristic B (peak reflected wavelength=590 nm) in a planar state and has a spectral reflectance characteristic C in a focal-conic state. Thus, when the wavelength of light to be selectively reflected by the liquid crystal is set to have the characteristic curve B and when a blue light absorbing layer is provided on the side opposite the observing side, the liquid crystal displays white in a planar state and displays blue in a focal-conic state. Further, the liquid crystal is capable of displaying intermediate tones between blue and white by selecting intermediate reflection states.

The liquid crystal 21 preferably exhibits a cholesteric phase at room temperature. Especially chiral nematic liquid crystal which is obtained by adding a sufficient amount of chiral agent to nematic liquid crystal so as to cause the liquid crystal to exhibit a cholesteric phase is suited to be used as the liquid crystal 21.

A chiral agent is a dopant which, when it is added to nematic liquid crystal, twists molecules of the nematic liquid crystal. By adding a chiral agent to nematic liquid crystal, the liquid crystal molecules form a helical structure with uniform twist intervals, and thus, the liquid crystal exhibits a cholesteric phase.

The use of chiral nematic liquid crystal of this kind as a display medium permits production of a liquid crystal display panel which can continue displaying an image thereon permanently with no voltages applied thereto, that is, a liquid crystal display panel with a so-called memory effect.

The liquid crystal display 10 is not limited to have the structure above. The resin pillars 20 may be replaced with resin walls or may be omitted. It is also possible to form a polymer-dispersed type liquid crystal composite layer in which liquid crystal is dispersed in a conventional three-dimensional polymer net or in which a three-dimensional polymer net is formed in liquid crystal.

As the substrates 11 and 12, glass substrates and resin substrates such as polycarbonate, etc. are usable. As the electrodes 13 and 14, transparent conductive films of ITO (indium tin oxide), etc. can be used.

As the insulating layers 15, inorganic materials such as silicon oxide, etc. and organic materials such as polyimide, etc. are usable. The insulating layers 15 may contain a coloring agent. As the alignment controlling layers 16, organic materials such as polyimide, etc. and inorganic materials such as aluminum oxide, etc. can be used, and a rubbing treatment may be carried out on the alignment controlling layers 16. A single layer may be used as the insulating layer 15 and also as the alignment controlling layer 16.

Driving Circuit; FIG. 2

FIG. 2 shows the pixel structure of the liquid crystal display 10. The liquid crystal display 10 is a matrix composed of a plurality of scanning electrodes R1, R2 through Rm and a plurality of signal electrodes C1, C2 through Cn (m, n: natural numbers). The scanning electrodes R1, R2 through Rm are connected to output terminals of a scanning electrode driving IC 131, and the signal electrodes C1, C2 through Cn are connected to output terminals of a signal electrode driving IC 132.

The scanning electrode driving IC 131 sends a selection signal to a specified one of the scanning electrodes R1, R2 through Rm while sending non-selection signals to the other scanning electrodes. The scanning electrode driving IC 131 sends the selection signal to the scanning electrodes R1, R2 through Rm one by one sequentially at specified time intervals. Meanwhile, the signal electrode driving IC 132 sends signals in accordance with image data to the signal electrodes C1, C2 through Cn simultaneously so that writing can be carried out on the pixels on the selected one of the scanning electrodes R1, R2 through Rm. For example, when a scanning electrode Ra is selected (a: natural number, a≦m), the pixels LRa-C1 through LRa-Cn which are located on the intersections between the scanning electrode Ra and the signal electrodes C1, C2 through Cn are updated simultaneously. In each pixel, the voltage difference between the scanning electrode and the signal electrode acts as a writing voltage, and each pixel is updated in accordance with the writing voltage.

Writing on the screen is carried out by selecting all the scanning lines sequentially. When writing on part of the screen is desired, specified scanning lines including the part to be updated should be selected. Thereby, writing is carried out on only a necessary part, and the writing is fast.

A control section comprises a CPU 135 for controlling the entire display, an LCD controller 136 for controlling the driving ICs 131 and 132, an image processing device 137 for carrying out various kinds of processing of image data and an image memory 138 stored with image data. In the CPU 135, a ROM stored with a control program and various kinds of data and a RAM for storing various kinds of data are installed.

Electric power is supplied from a power source 140 to the driving ICs 131 and 132. The LCD controller 136 controls the driving ICs 131 and 132 in accordance with image data stored in the image memory 138, and the driving ICs 131 and 132 apply voltages to the scanning electrodes and the signal electrodes of the liquid crystal display 10. Thus, an image is written on the display 10.

Also, the CPU 135 reads temperature information from the temperature sensor 139 which is located in the vicinity of the liquid crystal display 10, and the data are temporarily stored in the RAM. The ROM is stored with information which is used to determine the lengths of the selection pulse application step Tsp and the selection step Ts, the selection voltage and other driving conditions in accordance with the circumstantial temperature.

Driving Principle and Basic Driving Waves; See FIG. 4

First, the principle of a method of driving the liquid crystal display 10 is described. In the following description, basic driving waves output from the scanning driving IC are positive pulse waves, and basic driving waves output from the signal driving IC are alternating pulse waves. However, the basic driving waves are not necessarily of these forms. For example, the pulse waves output from the scanning driving IC may be negative or may be changeable between positive and negative alternately (for example, for every frame). Also, the pulse waves output from the scanning driving IC may be alternating. The use of direct pulses brings an advantage of consumption of less electric power, and the use of alternating pulses brings an advantage of prevention of the liquid crystal from aging.

The basic driving waves output from the scanning electrode driving IC 131 to each of the scanning electrodes is referred to as scanning pulse waves. The basic driving waves output from the signal electrode driving IC 132 to each of the signal electrodes is referred to as signal pulse waves, and the signal pulse waves are in accordance with image data. Under this driving principle, a driving method comprises generally a reset step Trs, a selection step Ts, an evolution step Trt and a display step Ti (which is also called a crosstalk step).

The selection step Ts further comprises a selection pulse application step Tsp, a pre-selection step Tsz and a post-selection step Tsz'. A scanning step Tss is a step of applying the signal pulse waves, and the scanning step Tss are expressed as follows:

$Tss = Tsp \times 2$ $Tss = Ts - (Tsz + Tsz')$

In the reset step Trs, the scanning electrode driving IC 131 outputs a reset pulse of a voltage $V_1$. In the selection step Ts, the scanning electrode driving IC 131 outputs a selection pulse of a voltage $V_2$ at the selection pulse application step Tsp and outputs 0 volts at the pre-selection step Tsz and the post-selection step Tsz'. The signal electrode driving IC 132, in the scanning step Tss, outputs signal pulses of voltages $\pm V_4$ in accordance with image data. Thus, a chain of pulses of different kinds (a reset pulse, a selection pulse and an evolution pulse) is outputted from the scanning electrode driving IC 131, and signal pulses (preferably alternating pulses of a voltage which is too small to cause crosstalk) are output from the signal electrode driving IC 132.

Next, the state of the liquid crystal is described. First in the reset step Trs, when the reset pulse of $V_1$ is applied to the liquid crystal, the liquid crystal comes to a homeotropic state. Next in the pre-selection step Tsz, the liquid crystal is twisted a little. Then, in the scanning step Tss, the selection pulse and the signal pulses are superimposed onto the liquid crystal. Thereby, as the final state of each pixel, a planar state (white), a focal-conic state (blue) or an intermediate state (an intermediate color) can be selected.

First, a case of selecting a planar state is described. In the scanning step Tss, the selection pulse and the signal pulses are applied in such a way to cause superimposed pulses with relatively large energy, and thereby, the liquid crystal comes to a homeotropic state again. Thereafter, in the post-selection step Tsz', the liquid crystal is twisted a little. Next in the evolution step Trt, the evolution pulse of $V_3$ is applied, and thereby, the liquid crystal, which has been twisted a little in the post-selection step Tsz', is untwisted again and comes to a homeotropic state. Thereafter, when the voltage applied to the liquid crystal becomes zero, the liquid crystal comes to a planar state and stays in the state thereafter.

Next, a case of selecting a focal-conic state is described. In the scanning step Tss, the selection pulse and the signal pulses are applied in such a way to cause superimposed pulses with smaller energy compared with the case of selecting a planar state. Thereafter, in the post-selection step Tsz', the liquid crystal is twisted to an extent to have an approximately double helical pitch.

Then, the evolution pulse of $V_3$ is applied, and thereby, the liquid crystal, which has been twisted in the post-selection step Tsz', comes to a focal-conic state. Thereafter, even when the voltage applied to the liquid crystal becomes zero, the liquid crystal stays in the focal-conic state.

In this way, the final state of the liquid crystal can be selected by adjusting the energy of the superimposed pulses of the selection pulse and the signal pulses applied in the scanning step Tss. Specifically, the adjustment of the energy of the superimposed pulses is carried out by changing the phase of the signal pulses. Further, by changing the selection pulse voltage $V_2$ and by changing the length of the selection pulse application step Tsp (that is, the selection pulse width), temperature compensation control to cope with a change in temperature of the liquid crystal is carried out. In the following, the temperature compensation control is described.

Contrast and γ Characteristic Curve; See FIG. 5

With respect to drive control of the liquid crystal display, one of the most important thing is to display images with good contrast between blue and white in the entire temperature range in which image writing on the liquid crystal display is expected to be carried out. For this purpose, the contrast must be not less than 3.5. Also, when the liquid crystal display is driven under the conditions which will be described later in connection with specific examples, in the γ characteristic curve which indicates the relationship between the voltage of the selection pulse applied to a scanning electrode and the reflectance finally obtained from the application of the voltage to the scanning electrode, the difference between the voltage (V95) for achieving the reflectance of 95% of the saturated reflectance (% R95) and the voltage (V05) for achieving the reflectance of 5% of the saturated reflectance (% R05) must be within a range from 5 volts to 9 volts.

FIG. 5 shows an exemplary γ characteristic curve. In the case of FIG. 5, the voltage V95 for achieving the reflectance % R95 is 28V, and the voltage V05 for achieving the reflectance % R05 is 20V Accordingly, the voltage difference (γ) is 8 (28–20).

In order to enable a driving IC for general purpose which outputs voltages, for example, within a range from approximately ±2.5 to approximately ±4.5 to be used as the signal electrode driving IC 132, γ is preferably within a range from 5 to 9. If γ is over 9, it is impossible to display a planar state and a focal-conic state with good contrast. On the other hand, if γ is under 5, the contrast is apt to be influenced by the aging of the liquid crystal and the environment. According to the present invention, by the following driving method, contrast of not less then 3.5 and γ within a range from 5 to 9 could be attained.

Specific Examples of Liquid Crystal Display

In the following, a method of driving a liquid crystal display is described referring to specific data obtained from an experiment. An exemplary liquid crystal display which was used for the experiment has the following specifications.

Substrates: Both the upper and lower substrates were glass substrates with a thickness of 0.7 mm.
Gap between the Substrates: 5.5 μm
Electrodes: ITO films with a resistance of 10 Ω/□
Aligning Layers: polyimide resin
Liquid Crystal: a liquid crystal material ZLI1565, a chiral agent CB15, a chiral agent R1011 (these materials are all made by Merck & Co.,) were mixed together at the ratio of 82.1:13.2:4.7. The viscosity at 25° C. was 49 c.P.
Driving Waves: See FIG. 4. The scanning pulse waves were switched between the positive polarity and the negative polarity alternately for writing of every frame.

Driving Method; See FIGS. 4, 6 and 7

Figure 4:
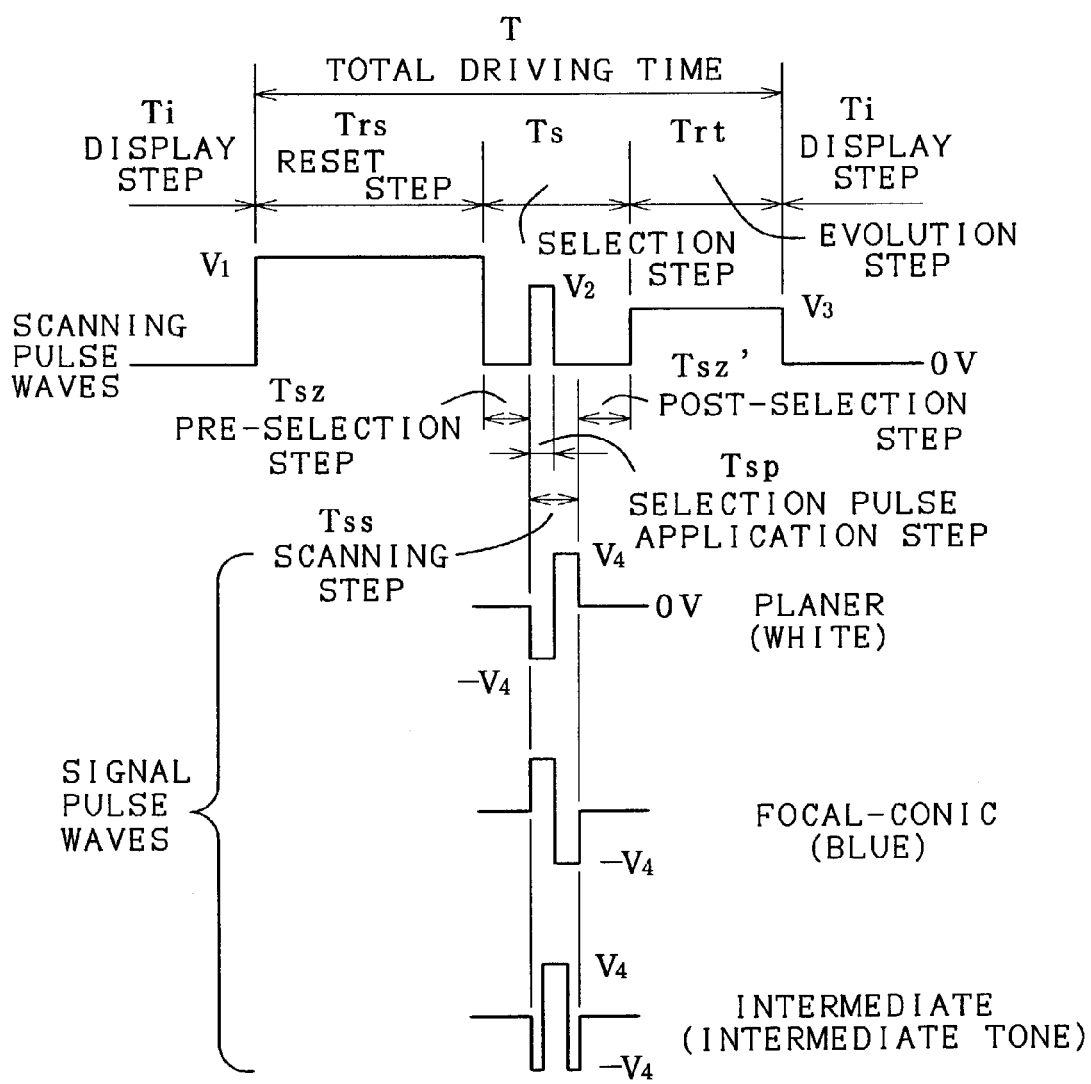
FIG. 4 is a chart which shows driving pulses applied to the liquid crystal display.

The driving waves shown by FIG. 4 were set to have the following values under a circumstantial temperature of 25° C.:

the reset voltage $V_1$ was 40V;
the length of the reset step Trs was 48 ms;
the selection voltage $V_2$ was 16V;
the length of the selection step Ts was 0.74 ms;
the length of the selection pulse application step Tsp was 0.074 ms (accordingly, the length of the scanning step Ts was 0.148 ms);
the lengths of the pre-selection step Tsz and the post-selection step Tsz' were both 0.296 ms;
the evolution voltage $V_3$ was 27.5V;
the length of the evolution step Trt was 24 ms;
the total driving time T of each pixel was 72.74 ms; and
the signal voltage $±V_4$ was 4V.

The reset voltage $V_1$, the evolution voltage $V_3$ and the signal voltage $±V_4$ were fixed in the entire operating temperature range. As will be described later, the lengths of the selection pulse application step Tsp (accordingly the length of the selection pulse Ts), the reset step Trs and the evolution step Trt were changed with changes in circumstantial temperature. Also, the ratio of the length of the selection pulse application step Tsp and the length of the selection pulse Ts (Tsp/Ts) was changed intermittently with changes in circumstantial temperature among some temperature ranges while the ratio Trs:Trt:Ts was kept constant, and the selection voltage $V_2$ was changed with changes in circumstantial temperature. The length of the scanning step Tss changes in accordance with the changes in length of the selection pulse application step Tsp. The signal voltage $±V_4$ might be changed with changes in temperature; however, by setting the signal voltage $V_4$ to be constant in the entire operating temperature range, the structure of the power source 140 can be simplified.

As already mentioned, chiral nematic liquid crystal changes its responsibility to a driving pulse with changes in circumstantial temperature. In other words, the responsibility of chiral nematic liquid crystal to a driving pulse depends on its viscosity and its anisotropy of dielectric constant. Under a low temperature, the viscosity of chiral nematic liquid crystal becomes high, and its responsibility to a driving pulse becomes low. Under a high temperature, the viscosity of chiral nematic liquid crystal becomes low, and its responsibility to a driving pulse becomes high.

In order to compensate the temperature characteristic of the liquid crystal caused by changes in viscosity, according to this embodiment, the total length of a chain of driving pulses is set according to the circumstantial temperature detected by the temperature sensor 139. More specifically, the total length of a chain of driving pulses is changed while the ratio of the length of the reset step, the length of the selection step, the length of the evolution step and the length of the scanning step to one another is kept constant. Further, in each of some temperature ranges, while the ratio of the widths of the respective pulses (the reset pulse, the selection pulse, the evolution pulse and the signal pulse) to one another is kept constant, the total length of a chain of driving pulses is changed, and accordingly, in each temperature range, the length of the selection pulse application step Tsp is changed with changes in temperature.

The response speed of chiral nematic liquid crystal to a driving pulse, which changes with changes in viscosity, becomes higher as the temperature is rising. Therefore, the length of the selection pulse application step Tsp (also the length of the scanning step Tss) is set so as to become shorter as the temperature is rising and so as to become longer as the temperature is falling in each temperature range. According to the changes in length of the selection pulse application step Tsp, the total length of a chain of driving pulses is changed while the ratio Trs:Ts:Trt is kept constant. These changes are realized by, for example, modulation of a basic clock signal which is produced by basic clock producing means installed in the LCD controller 136 by order of the CPU 135. Alternatively, the count number of the clock signal and/or the dividing factor may be changed.

Figure 6:
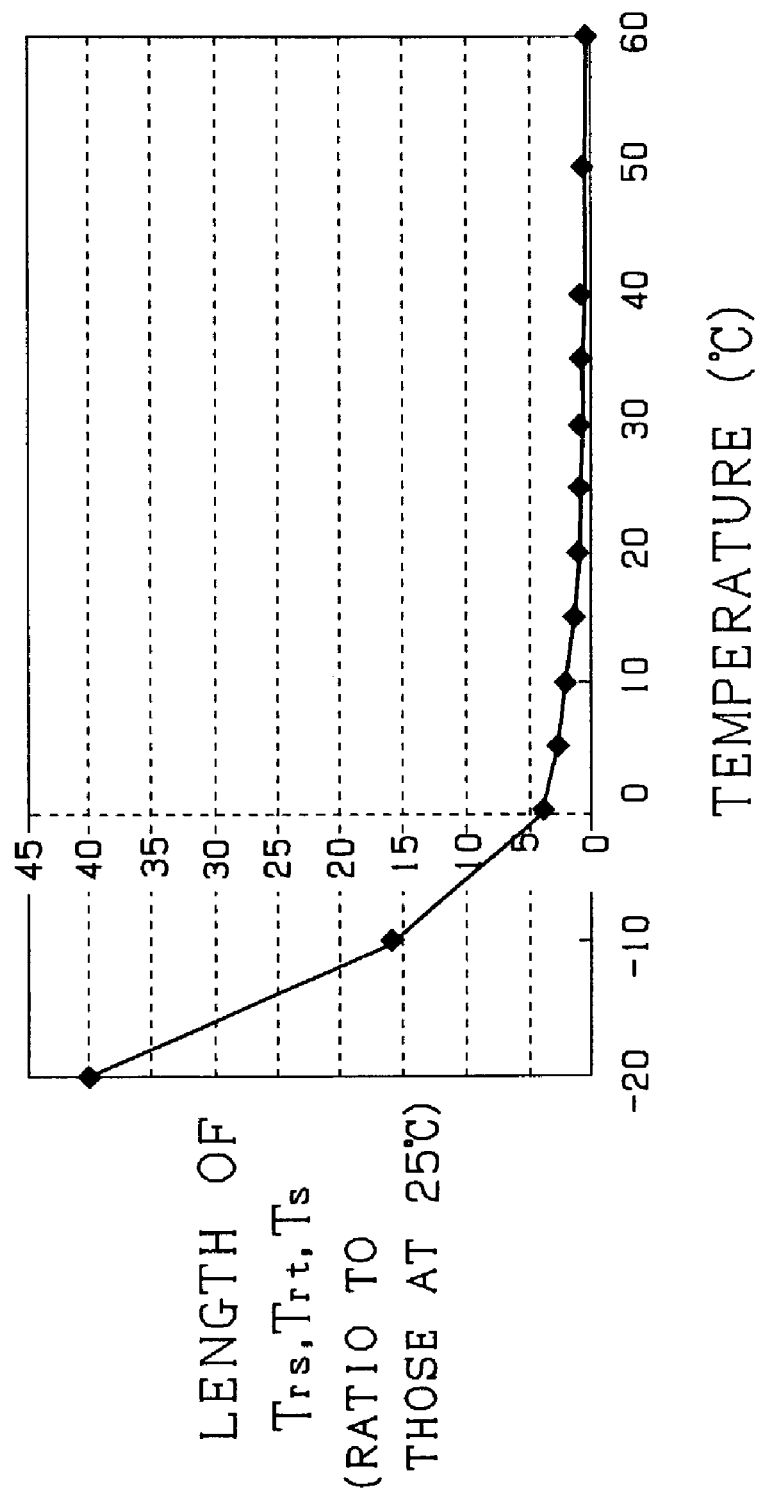
FIG. 6 is a graph which shows an exemplary way of changing the length of a selection step with changes in temperature.

In the experiment, the total length of a chain of driving pulses, that is, the total driving time T was changed in such a way that the length of the selection step Ts would change as shown by Table 1 below and FIG. 6 with changes in temperature. In Table 1 and FIG. 6, the length of the selection step Ts at 25° C. is shown as 1.00.

TABLE 1

| Temperature (° C.) | Rate (to the total driving length at 25° C.) | Total Driving Time (ms) |
| --- | --- | --- |
| −20 | 40.54 | 2948.92 |
| −10 | 16.22 | 1179.57 |
| 0 | 4.05 | 294.89 |
| 5 | 2.97 | 216.25 |
| 10 | 2.23 | 162.19 |
| 15 | 1.55 | 113.04 |
| 20 | 1.22 | 88.47 |
| 25 | 1.00 | 72.74 |
| 30 | 0.84 | 60.94 |
| 35 | 0.73 | 53.08 |
| 40 | 0.57 | 41.28 |
| 50 | 0.43 | 31.46 |
| 60 | 0.35 | 25.56 |

Figure 7:
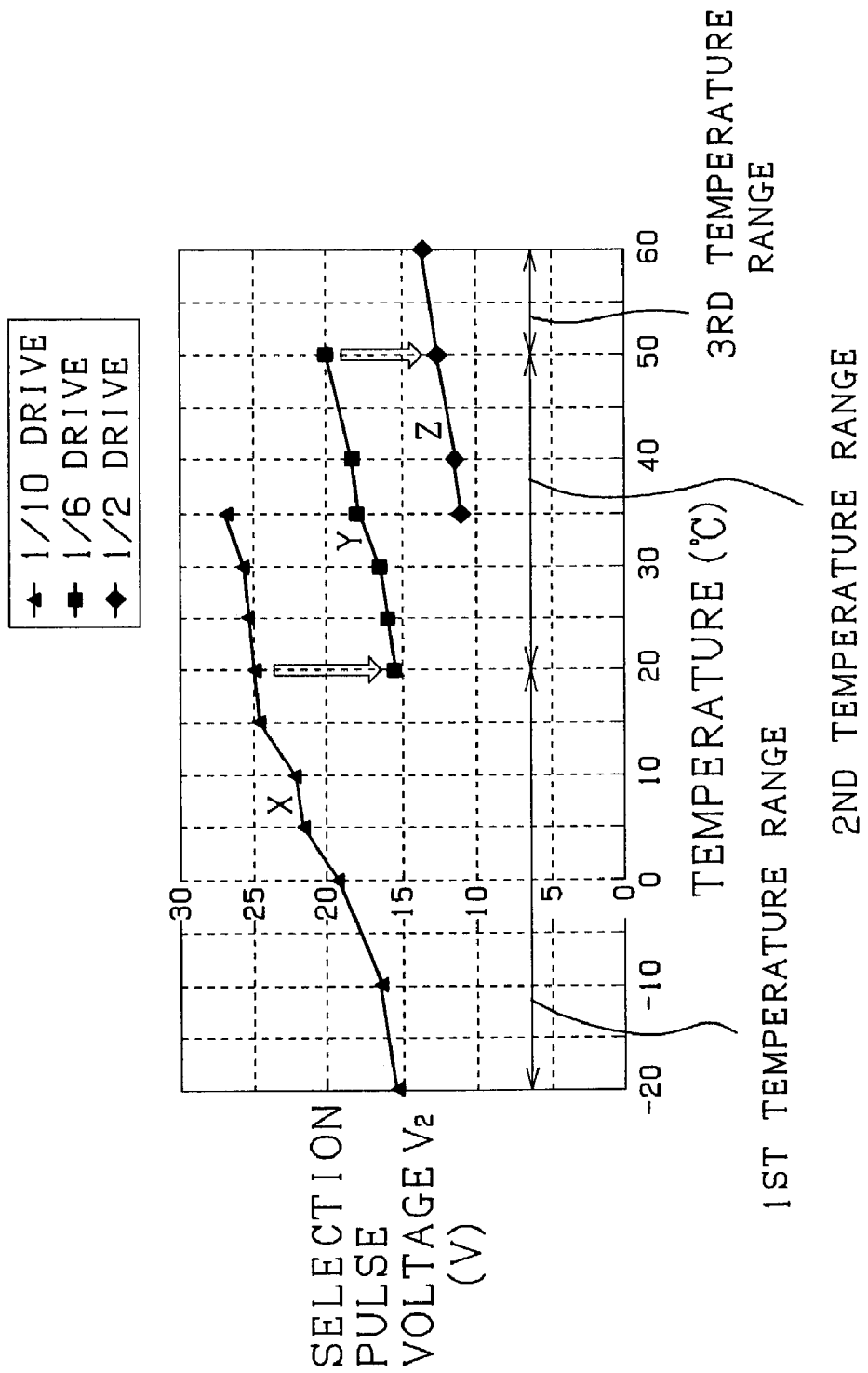
FIG. 7 is a graph which shows an exemplary way of changing a selection pulse voltage with changes in temperature.

Also, the ratio Tsp/Ts was changed step by step depending on the temperature range. When the ratio Tsp/Ts is 1/10, this is referred as a 1/10 drive. When the ratio Tsp/Ts is 1/6, this is referred as a 1/6 drive. When the ratio Tsp/Ts is 1/2, this is referred to as a 1/2 drive. As FIG. 7 shows, in a first temperature range (from −20° C. to 20° C.), the 1/10 drive was carried out as shown by the curve X, and in a second temperature range (over 20° C. to 50° C.), the 1/6 drive was carried out as shown by the curve Y. In a third temperature range (over 50° C. to 60° C.),the 1/2 drive was carried out as shown by the curve Z. In other words, the driving mode was switched from the 1/10 drive to the 1/6 drive at 20° C. and switched from the 1/6 drive to the 1/2 drive at 50° C.

Thus, by changing the ratio Tsp/Ts depending on the temperature range, the selection pulse width is prevented from changing too largely. Without this adjustment, when the temperature becomes very high, the selection pulse width may be so small as to cause deformation of the wave and/or not to cause the driving IC to make an output. The se problems can be prevented by the adjustment. With this adjustment, also, temperature compensation in a low temperature range is possible without widening the selection pulse width and accordingly without lowering the writing speed. Therefore, the driving ICs are not required to have so high a data transmission speed.

With respect to the anisotropy of dielectric constant of chiral nematic liquid crystal, as the temperature is falling, it becomes lower, and accordingly, the responsibility of the liquid crystal to a driving pulse becomes lower. In order to compensate the temperature characteristic caused by changes in anisotropy of dielectric constant, according to the present invention, as FIG. 7 shows, the selection voltage $V_2$ is changed with changes in temperature.

In the experiment, in each of the first, second and third temperature ranges, the selection pulse voltage $V_2$ was changed so as to become higher with a rise in circumstantial temperature and to become lower with a fall in circumstantial temperature. According to this embodiment, the signal pulse voltage output from the signal electrode driving IC 132 is not changed. However, as described above, most of the driving pulses are output from the scanning electrode driving IC 131, and the voltages of these pulses output from the scanning electrode driving IC 131 are changed with changes in circumstantial temperature. Consequently, the voltages applied to the liquid crystal change in circumstantial temperature. Also, as described above, the selection pulse voltage $V_2$ is changed based on different characteristic curves in the respective temperature ranges. With this control, it can be prevented that the selection pulse voltage may vary in a too wide range. Thereby, it is not necessary to prepare a driving circuit with a large withstand voltage and a large-capacity power source, which prevents an increase in cost. In this case, as FIG. 7 shows, preferably, the characteristic curve which determines the selection pulse voltage $V_2$ in a lower temperature range shows higher voltages than the characteristic curve which determines the selection pulse voltage $V_2$ in a higher temperature range. For example, as shown in FIG. 7, the voltage which is shown by the characteristic curve X for the first temperature range at a temperature (for example, 20° C.) is larger than the voltage which is shown by the characteristic curve Y for the second temperature range at the same temperature (20° C.).

Figure 8:
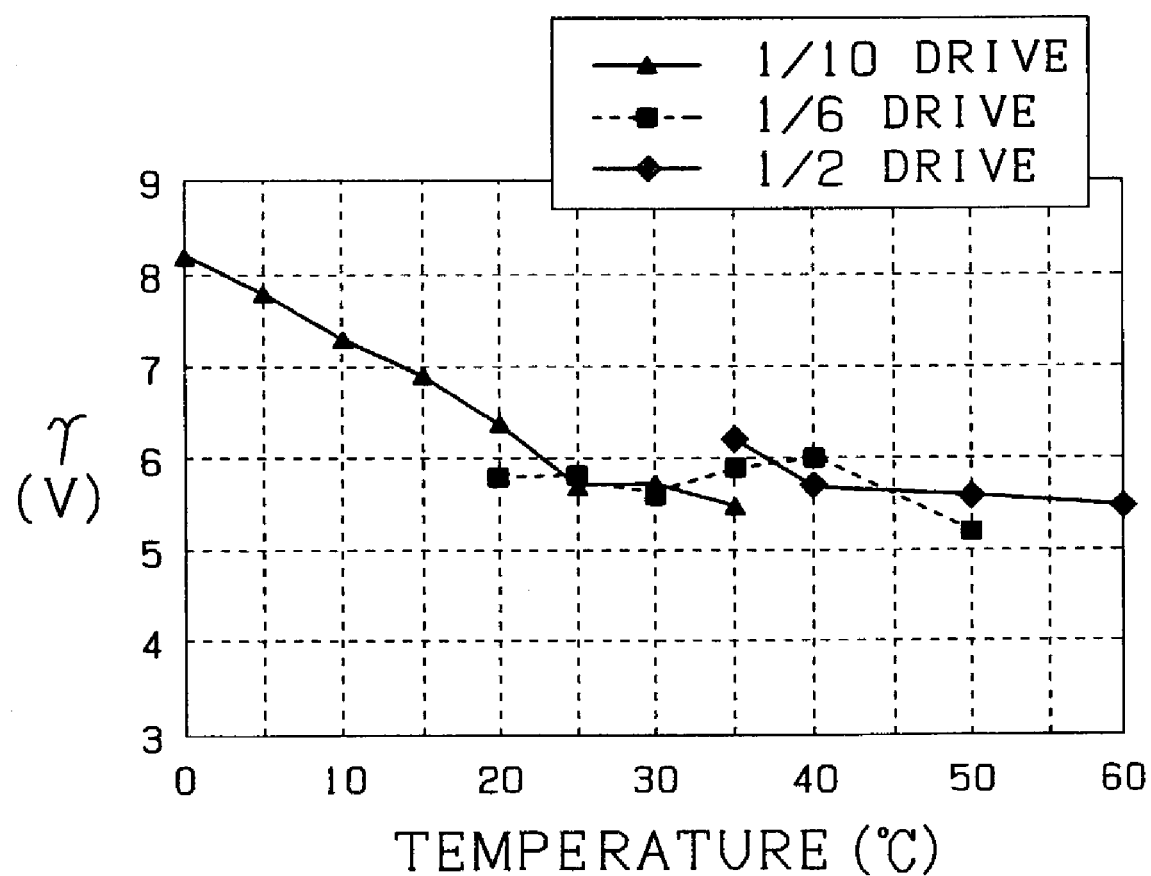
FIG. 8 is a graph which shows changes in γ with changes in temperature.
Figure 9A:
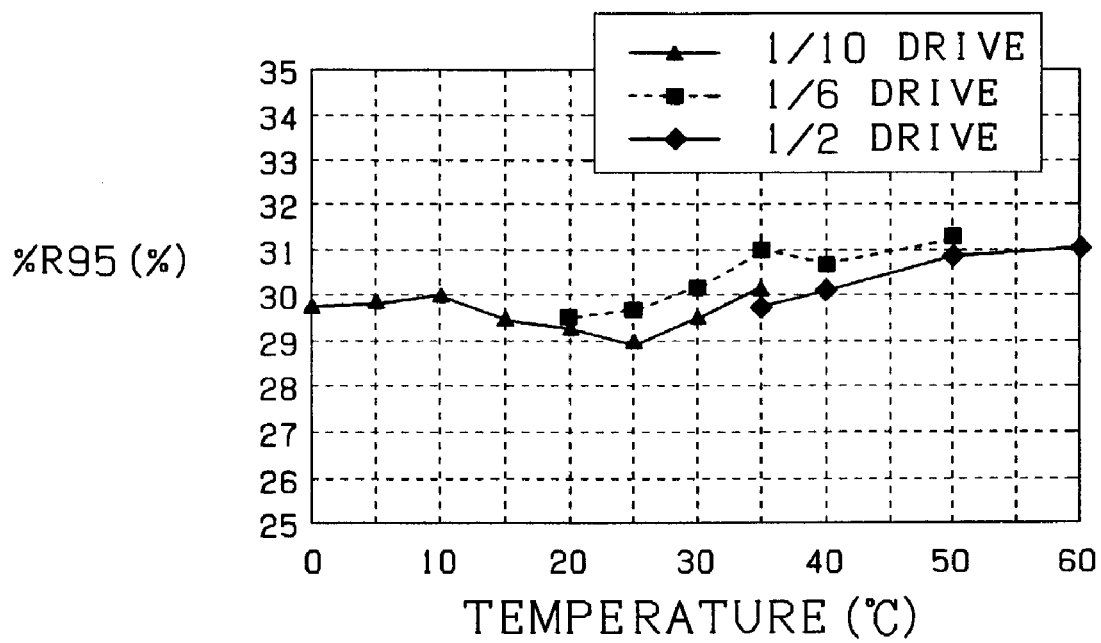
FIGS. 9a and 9b are graphs which show changes in reflectance of liquid crystal with changes in temperature, FIG. 9a showing the reflectance when the liquid crystal is in a planar state and FIG. 9b showing the reflectance when the liquid crystal is in a focal-conic state.
Figure 9B:
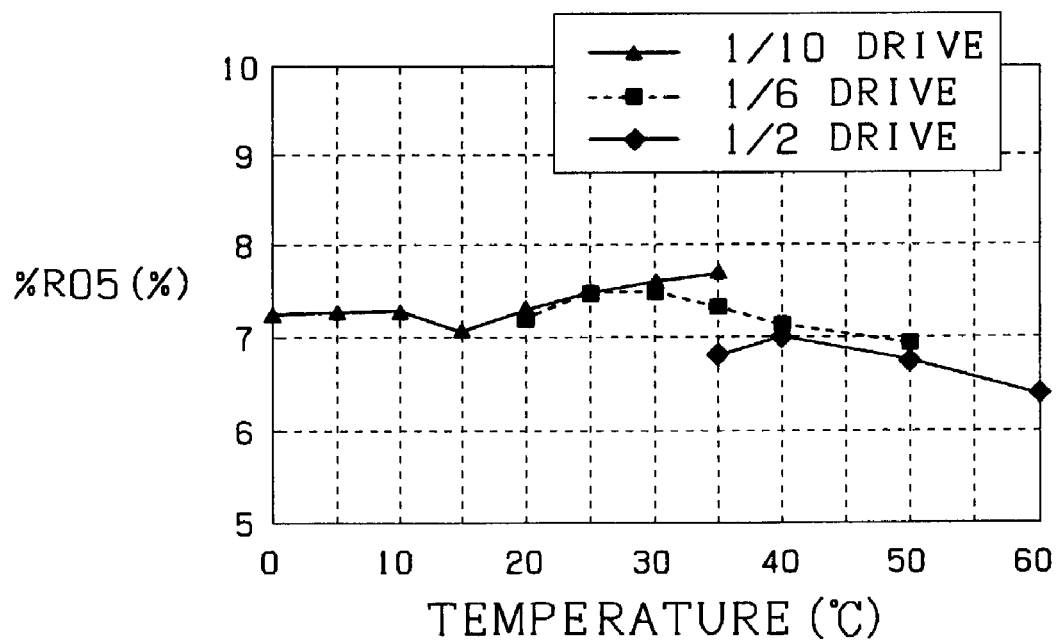

When the liquid crystal display 10 was driven by the method shown by FIG. 7, λ varied within a range from 5 to 9 with changes in temperature (see FIG. 8), which is preferable. FIG. 9a shows variations in reflectance % R95 (reflectance in a planar or a white state) achieved by the voltage V95 with changes in temperature in this case, and FIG. 9b shows variations in reflectance % R05 (reflectance in a focal-conic or a blue state) achieved by the voltage V05. As is apparent from FIGS. 9a and 9b, in the entire operating temperature range, the contrast was not less than 3.5.

Figure 10:
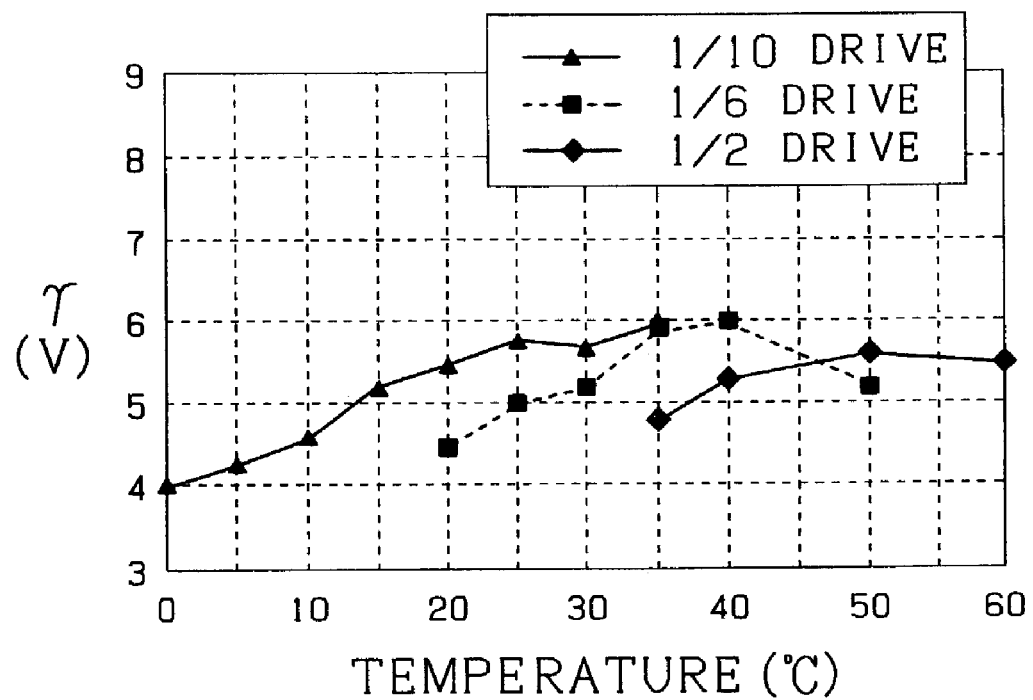
FIG. 10 is a graph which shows changes in γ with changes in temperature as a result of a comparative experiment.
Figure 11A:
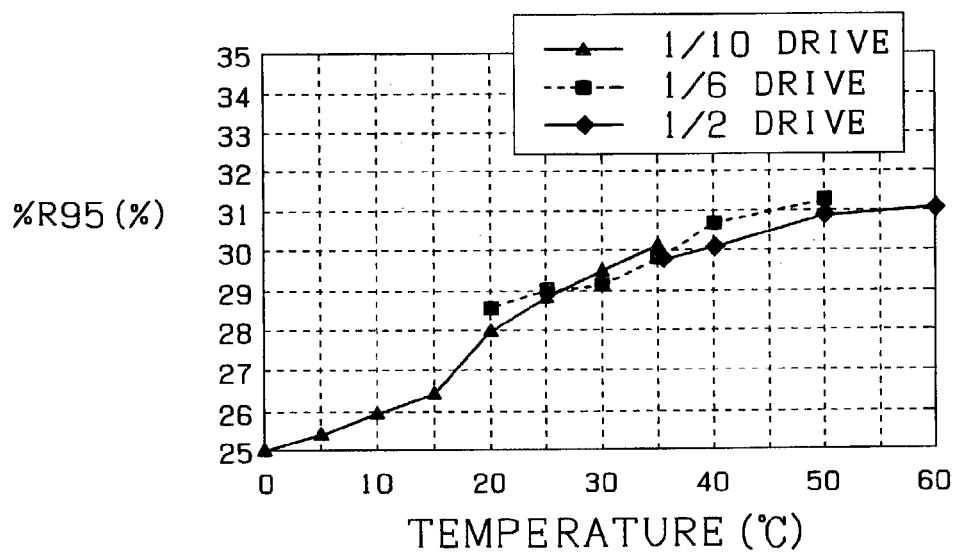
FIGS. 11a and 11b are graphs which show changes in reflectance of liquid crystal with changes in temperature as a result of the comparative experiment, FIG. 11a showing the reflectance when the liquid crystal is in a planar state and FIG. 11b showing the reflectance when the liquid crystal is in a focal-conic state.
Figure 11B:
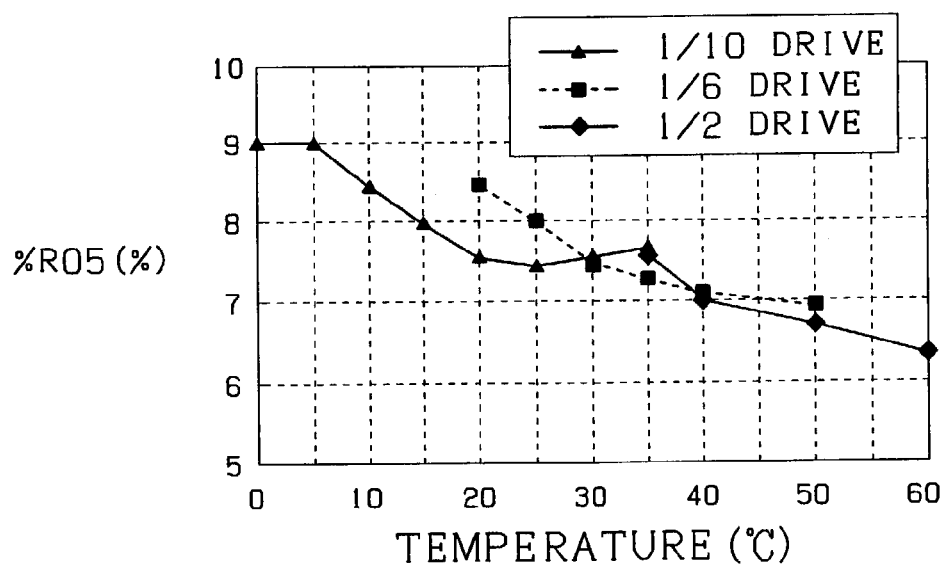

FIGS. 10, 11a and 11b show the results of a comparative experiment in which the selection voltage $V_2$ was fixed to 25V in the 1/10 drive, was fixed to 18V in the 1/2 drive and was fixed to 12V in the 1/2 drive. In this case, as FIG. 10 shows, λ varied within a range from 4 to 6 with changes in temperature. FIG. 11a shows variations in reflectance % R95 (reflectance in a planar or a white state) achieved by the voltage V95 with changes in temperature in this case, and FIG. 11b shows variations in reflectance % R05 (reflectance in a focal-conic or a blue state) achieved by the voltage V05. As is apparent from FIGS. 11a and 11b, the contrast was less than 3.5 in some temperature ranges.

The reflectance was measured by use of a pulse generating device and a spectrocolorimeter. In the description above, the contrast means % R95/% R05.

Evolution Pulse Voltage; See FIG. 12

Figure 12:
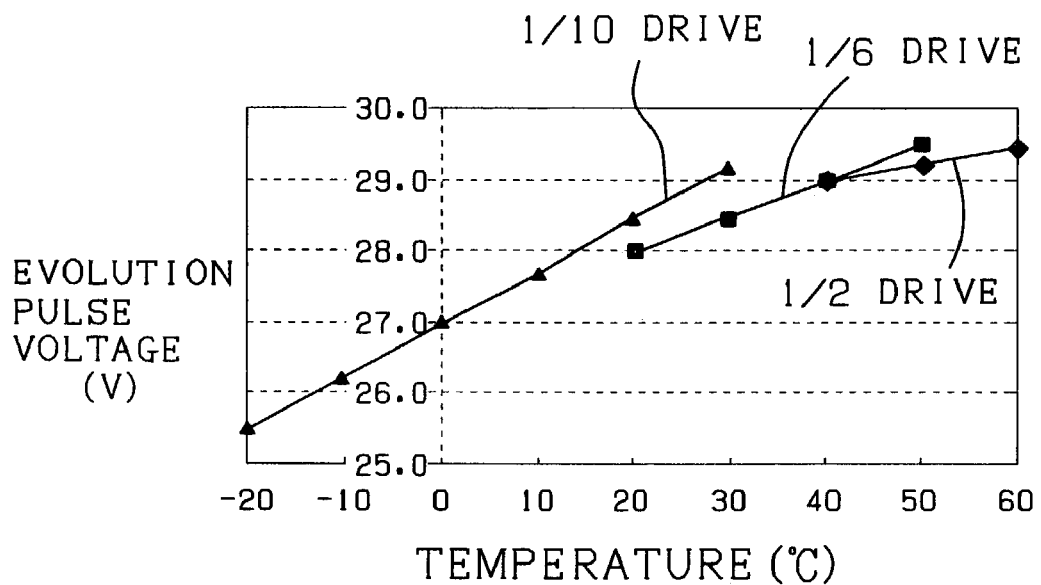
FIG. 12 is a graph which shows an exemplary way of changing an evolution pulse voltage with changes in temperature.
Figure 13:
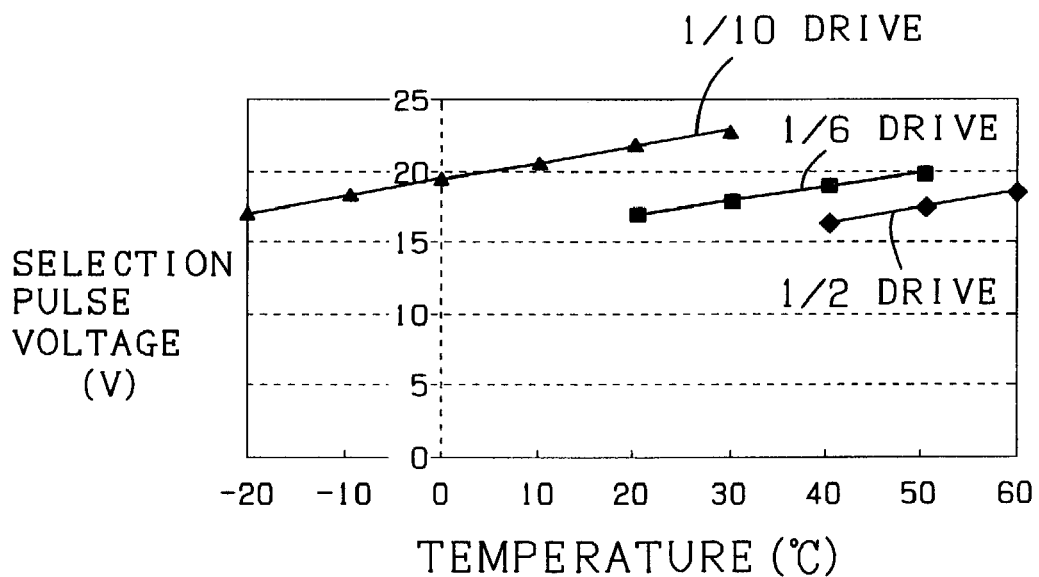
FIG. 13 is a graph which shows an exemplary way of changing the selection pulse voltage with changes in temperature when the evolution pulse voltage is changed as shown in FIG. 12.

According to the embodiment described above, the evolution pulse voltage $V_3$ is fixed in the entire operating temperature range. However, the evolution voltage $V_3$ may be changed with changes in temperature. FIG. 12 shows an exemplary way of changing the evolution voltage with changes in temperature. FIG. 13 shows an exemplary way of changing the selection pulse voltage $V_2$ when the evolution voltage is changed as shown by FIG. 12.

When the evolution pulse voltage $V_3$ is also changed with changes in temperature, the number of parameters controlled increases, and the selection pulse voltage $V_2$ can be changed within a smaller range. Therefore, voltage control with high accuracy becomes possible.

OTHER EMBODIMENTS

The structure, the materials and the manufacturing process of the liquid crystal display as shown by FIGS. 1a and 1b may be arbitrarily designed. The liquid crystal display may have two or more layers stacked one upon another.

Although the present invention has been described in connection with the preferred embodiments above, it is to be noted that various changes and modifications are possible to those who are skilled in the art. Such changes and modifications are to be understood as being within the scope of the present invention.

What is claimed is:

1. A liquid crystal display apparatus comprising:
   a liquid crystal display which comprises a plurality of pixels arranged in a matrix;
   a driving circuit which comprises a scanning electrode driver and a signal electrode driver and which drives the liquid crystal display by a simple matrix driving method; and
   a controller which controls the driving circuit in such a way that waveforms of pulses output from the scanning electrode driver change depending on a circumstantial temperature of the liquid crystal display;
   wherein:
      the controller controls the driving circuit to heighten a voltage of a selection pulse, which is output from the scanning electrode driver to determine a final state of the liquid crystal, with a rise in circumstantial temperature within a specified temperature range and to lower the voltage of the selection pulse with a fall in circumstantial temperature within the temperature range;
      the scanning electrode driver outputs a chain of driving pulses comprising different kinds of pulses; and
      the controller controls the driving circuit in such a way that within a specified temperature range, a total length of the chain of driving pulses changes depending on the circumstantial temperature while a ratio of the widths of the pulses to one another is constant.

2. A liquid crystal display apparatus according to claim 1, wherein the controller controls the driving circuit to narrow a width of the selection pulse with a rise in circumstantial temperature and widen the width of the selection pulse with a fall in circumstantial temperature.

3. A liquid crystal display apparatus according to claim 1, wherein:
   the controller controls the driving circuit to heighten the voltage of the selection pulse output from the scanning electrode driver with a rise in circumstantial temperature within each range of a first temperature range and a second temperature range and to lower the voltage of the selection pulse with a fall in circumstantial temperature within each range of the first temperature range and the second temperature range;
   wherein the heightening/lowering of the selection pulse voltage within the first temperature range is based on a first characteristic curve and the heightening/lowering of the selection pulse voltage within the second temperature range is based on a second characteristic curve mutually different from the first characteristic curve.

4. A liquid crystal display apparatus according to claim 3, wherein the first characteristic curve which determines the heightening/lowering of the selection pulse voltage within a lower temperature range shows larger values than the second characteristic curve which determines the heightening/lowering of the selection pulse voltage within a higher temperature range.

5. A liquid crystal display apparatus according to claim 1, further comprising a temperature sensor for detecting a circumstantial temperature of the liquid crystal display.

6. A liquid crystal display apparatus according to claim 1, wherein:
   the signal electrode driver outputs pulses of an alternating voltage; and
   the scanning electrode driver outputs pulses of a direct voltage.

7. The liquid crystal display apparatus according to claim 1, wherein the controller controls the driving circuit to change a phase of pulses output from the signal electrode driver in order to create an image.

8. The liquid crystal display apparatus according to claim 1, wherein the controller controls the driving circuit to keep a voltage of the pulses output from the signal electrode driver regardless of the circumstantial temperature.

9. A liquid crystal display apparatus comprising:
   a liquid crystal display comprising a liquid crystal composition which contains nematic liquid crystal and a chiral agent, which makes a display by using selective reflection of the liquid crystal composition in a cholesteric phase and which comprises a plurality of pixels arranged in a matrix;
   a driving circuit which outputs at least a reset pulse for resetting the liquid crystal composition to a homeotropic phase and a selection pulse for determining a final state of the liquid crystal composition; and
   a controller which controls the driving circuit in such a way that waveforms of pulses change depending on a circumstantial temperature of the liquid crystal display;
   wherein the controller controls the driving circuit to heighten a voltage of the selection pulse with a rise in circumstantial temperature within a specified temperature range and to lower the voltage of the selection pulse with a fall in circumstantial temperature within the temperature range.

10. A liquid crystal display apparatus according to claim 9, wherein the driving circuit further outputs an evolution pulse for causing the liquid crystal to evolve to the state which was determined by application of the selection pulse.

11. A liquid crystal display apparatus according to claim 10, wherein the controller controls the driving circuit to change a ratio Tsp/Ts with a change in circumstantial temperature, wherein Tsp is a time length of application of the selection pulse, and Ts is a time length from an end of application of the reset pulse to a start of application of the evolution pulse.

12. A liquid crystal display apparatus according to claim 10, wherein the controller controls the driving circuit to change a voltage of the evolution pulse depending on the circumstantial temperature.

13. A liquid crystal display apparatus according to claim 10, wherein the controller controls the driving circuit to keep a voltage of the evolution pulse regardless of the circumstantial temperature.

14. A liquid crystal display apparatus according to claim 9, wherein the controller controls the driving circuit to keep a voltage of the reset pulse regardless of changes in circumstantial temperature.

15. A liquid crystal display apparatus according to claim 9, wherein the liquid crystal display is capable of displaying an image thereon continuously after stoppage of application of a voltage thereto.

16. A liquid crystal display apparatus according to claim 9, wherein:
the driving circuit comprises a scanning electrode driver and a signal electrode driver;
the reset pulse, the selection pulse and the evolution pulse are output from the scanning electrode driver; and
the signal electrode driver outputs a pulse in accordance with image data in synchronization with an output of the selection pulse.

17. A liquid crystal display apparatus comprising:
a liquid crystal display which comprises a plurality of pixels arranged in a matrix;
a driving circuit which selectively applies pulse voltages to liquid crystal of the liquid crystal display so as to drive the liquid crystal display;
a temperature sensor which detects a circumstantial temperature of the liquid crystal display; and
a controller which controls the driving circuit in such a way that waveforms of pulses change depending on a circumstantial temperature of the liquid crystal display;
wherein:
the controller controls the driving circuit to heighten a voltage of a selection pulse, which determines a final state of the liquid crystal, with a rise in circumstantial temperature and lowers the voltage of the selection pulse with a fall in circumstantial temperature;
the scanning electrode driver outputs a chain of driving pulses comprising different kinds of pulses; and
the controller controls the driving circuit in such a way that within a specified temperature range, a total length of the chain of driving pulses changes depending on the circumstantial temperature while a ratio of the widths of the pulses to one another is constant.

18. A liquid crystal display apparatus according to claim 17, wherein the controller controls the driving circuit to narrow a width of the selection pulse with a rise in circumstantial temperature and to widen the width of the selection pulse with a fall in circumstantial temperature.

19. A liquid crystal display apparatus according to claim 18, wherein the controller controls the driving circuit to heighten the voltage of the selection pulse with a rise in temperature at least within a specified temperature range and to lower the voltage of the selection pulse with a fall in temperature at least within the temperature range.

* * * * *